United States Patent
Ovalekar

(10) Patent No.: US 6,928,105 B2
(45) Date of Patent: Aug. 9, 2005

(54) VECTOR TREE CORRELATOR FOR VARIABLE SPREADING RATES

(75) Inventor: Sameer V. Ovalekar, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 773 days.

(21) Appl. No.: 09/847,922

(22) Filed: May 3, 2001

(65) Prior Publication Data

US 2002/0176484 A1 Nov. 28, 2002

(51) Int. Cl.[7] .................. H04B 1/69; H04L 27/06
(52) U.S. Cl. .................. 375/150; 375/343
(58) Field of Search .................. 375/140, 142, 375/150, 316, 343, 130, 143, 147

(56) References Cited

U.S. PATENT DOCUMENTS

| | | | | | |
|---|---|---|---|---|---|
| 5,822,365 A | * | 10/1998 | Lee | ............................. | 375/150 |
| 5,894,494 A | * | 4/1999 | Davidovici | ................. | 375/150 |
| 6,005,903 A | * | 12/1999 | Mendelovicz | ............... | 375/367 |
| 6,148,313 A | * | 11/2000 | Freidin et al. | .............. | 708/422 |
| 6,181,733 B1 | * | 1/2001 | Shinde | ........................ | 375/152 |
| 6,366,938 B1 | * | 4/2002 | Levison et al. | ............. | 708/422 |
| 6,567,483 B1 | * | 5/2003 | Dent et al. | .................. | 375/343 |
| 6,823,000 B1 | * | 11/2004 | Gu | ............................. | 375/152 |
| 2003/0052711 A1 | * | 3/2003 | Taylor et al. | ................. | 326/38 |

* cited by examiner

Primary Examiner—Chieh M. Fan
Assistant Examiner—Jason M. Perilla

(57) ABSTRACT

A vector tree correlator correlates over received data spread at differing spreading rates or, over differing lengths of spreading sequence. When the maximum length sequence has a length N that is an integer power of 2, or $2^M$, then the vector tree correlator is formed from M levels. Level (1) is formed of add/subtract logic units, and Level (2) through Level (M) are formed of adders. Add/subtract logic units each receive a pair of received signal samples and combines the received signal samples based on a control signal input. The control signal input is derived from the locally generated spreading sequence. The output of the adder at the top of the tree is the result of the length N correlation, while output tap points at different levels of the tree each provide a correlation for one of the different spreading rates of length $2^m$, $1 < m < M$.

15 Claims, 2 Drawing Sheets

VECTOR TREE CORRELATOR FOR VARIABLE SPREADING RATES

BACKGROUND OF THE INVENTION

1. Field of the Invention

The present invention relates to vector correlation of a sequence with a received signal in a spread spectrum telecommunications system.

2. Description of the Related Art

Spread spectrum telecommunication systems transmit data by combining the data with a pseudo-random noise (PN) "spreading" sequence to increase its bandwidth (i.e., "spread" or widened to a much larger bandwidth than the data bandwidth, and also referred to as signal "spreading"). Spreading a data signal provides frequency diversity to the transmitted signal. The PN sequence is a pseudo-random sequence of binary values, or "chips", generated with a linear feedback shift register. The period of the PN sequence is T, while the period of each chip is $T_c$, $T \gg T_c$. In addition, some alignment between data and the PN sequence is usually present. For example, a given data bit period may contain 64 chips of the PN sequence. When several users' signals are each spread uniquely with a different PN sequence and superimposed in frequency over one another, the process is known as code-division, multiple access (CDMA). This spreading process provides noise rejection and some immunity from fading in the channel, while also allowing simultaneous transmission of several different user signals within the same frequency band.

A data signal that is spread and transmitted through a channel is de-spread at the receiver to recover the information bits of the data. De-spreading of the received signal at the receiver is accomplished by correlating the received signal with a locally generated version of the PN sequence and integrating over a pre-defined period that usually corresponds to the period $T_d$ of the data bit. When the spreading PN sequence of the received signal is synchronized in code phase with the locally generated PN sequence, the received signal is "collapsed" in bandwidth into the original data sequence by the process of correlation. Thus, a receiver requires a form of synchronization between the sequence used at the transmitter and the one employed at the receiver.

FIG. 1 shows a block diagram of prior art, direct sequence (DS) spread spectrum communication system 100 transmitting data d(t) from transmitter 101 to receiver 102 through channel 103. Data d(t) is spread with the PN sequence $PN_T(t)$ by multiplier 104 before up-converting and transmission to channel 103 at antenna 105. Receiver 102 includes antenna 106 that receives and down-converts the signal from channel 103 to generate the received signal r(t). The received signal r(t) is generally sampled with an analog to digital (A/D) converter to produce a sequence of received sample values. The locally generated PN sequence $PN_R(t)$ at receiver 102 is synchronized with the corresponding PN sequence $PN_T(t)$ of transmitter 101. Synchronization of PN sequence $PN_T(t)$ and $PN_R(t)$ may be achieved through a separate process and may be aided, for example, by a separate system pilot signal. $PN_R(t)$ is correlated with the received signal r(t) in multiplier 107 to generate the recovered information bits d'(t).

Correlation recovers each data bit as follows. For example, if a data bit is spread by a PN sequence of 64 chips, the received signal of the data bit is sampled at least twice i) the maximum spreading rate or ii) the gross chip rate after spreading (i.e., sample period is $T_c$) to generate 64 samples. Chips of the locally generated PN sequence are generally provided from a linear feedback shift register employing techniques well known in the art, with the contents of the shift register being a portion of the sequence at any given time. Reading the output sequence of individual registers of the shift register, termed "taps", provides phase-shifting of the PN sequence. Each sample is multiplied with a corresponding chip of the locally generated PN sequence, and the result added to the contents of an accumulation register. The total accumulator value after a data bit period represents an estimate of the de-spread and integrated data bit. A slicer may then generate a hard decision for the data bit from the total accumulator value at the end of the data bit period $T_d$. Typically the binary value of a PN sequence chip is either +1 or −1, and so each multiplication with a sample is typically implemented as a simple sign inversion of the sample value.

Two different prior art types of correlator for multiplier 207 may be used to multiply and accumulate, and thus correlate, the received data r(t) with the locally generated PN sequence $PN_R(t)$. The two types are 1) the serial correlator and 2) the parallel, or vector, correlator. In a serial correlator, the accumulation of the combination of samples of the received signal with chips of the PN sequence is performed on a chip-by-chip basis over the entire sequence, or serially, as chips are generated from the linear feedback shift register. In a vector correlator, the process of correlating the received sequence with the transmitted spreading sequence is performed in parallel by splitting up the sequence of received samples into several smaller sequences. Partial correlation of the PN sequence with the smaller sequences is then accomplished using correlation taps derived for the spreading sequence. A tree of adders may be used to accumulate the partial correlation results. A given implementation of a serial correlator is smaller in size and consumes less power than a corresponding implementation of a vector correlator, but the serial correlator takes a longer time to perform a correlation than the vector correlator.

In some CDMA systems, such as third generation (3G) cellular phone systems, variable spreading rates are used in which the length of the spreading PN sequence within a data bit varies. The spreading rate, also referred to as the Spread Factor (SF), depends on the raw data rate and is varied to keep the gross chip rate after spreading the same for all data rates. A drawback of prior art serial and vector correlators is that each particular implementation tends to be designed for fixed spreading rates, and is not well suited to these variable spreading rate systems.

SUMMARY OF THE INVENTION

In accordance with embodiments of the present invention, a vector tree correlator correlates over received samples of data spread at differing spreading rates or, equivalently, over the received samples with differing lengths of spreading sequence. The vector tree correlator is formed from M levels. Level (1) is formed of a first set of combiners such as add/subtract logic units, and Level (2) through Level (M) are formed from a second set of combiners such as adders. Add/subtract logic units of Level (1) each receive a pair of received signal samples and combines the received signal samples based on a control signal input. The control signal input is derived from the locally generated spreading sequence. Adders of each of L levels (2) through (M) combine corresponding pairs of output values from the previous level. The outputs of the lower level are paired sequentially, for example, from left to right to form "groups" that may be traced downward through the tree to the corresponding received samples input to the add/subtract logic units. The output of the adder at the top of the tree is the result of the maximum sequence length correlation. The vector tree correlator defines output tap points at different levels of the tree for different groups. Each tap point provides a correlation for one of the different spreading rates of length that are less than the maximum spreading rate.

In accordance with an embodiment of the present invention, a sequence of received samples are correlated with chip values of a locally generated sequence for one of a plurality of spreading rates. Correlation is accomplished by i) combining, at a first level of a tree structure, groups of at least two received samples based on corresponding chip values of the locally generated sequence to generate a correlation value for each group at the first level; and ii) combining, at one or more additional levels of the tree structure, a group of at least two correlation values of a previous level of the tree structure to generate a correlation value for the group at a current level of the tree structure. A correlation value of a group is provided at a corresponding output tap of the tree structure for one of the plurality of spreading rates.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
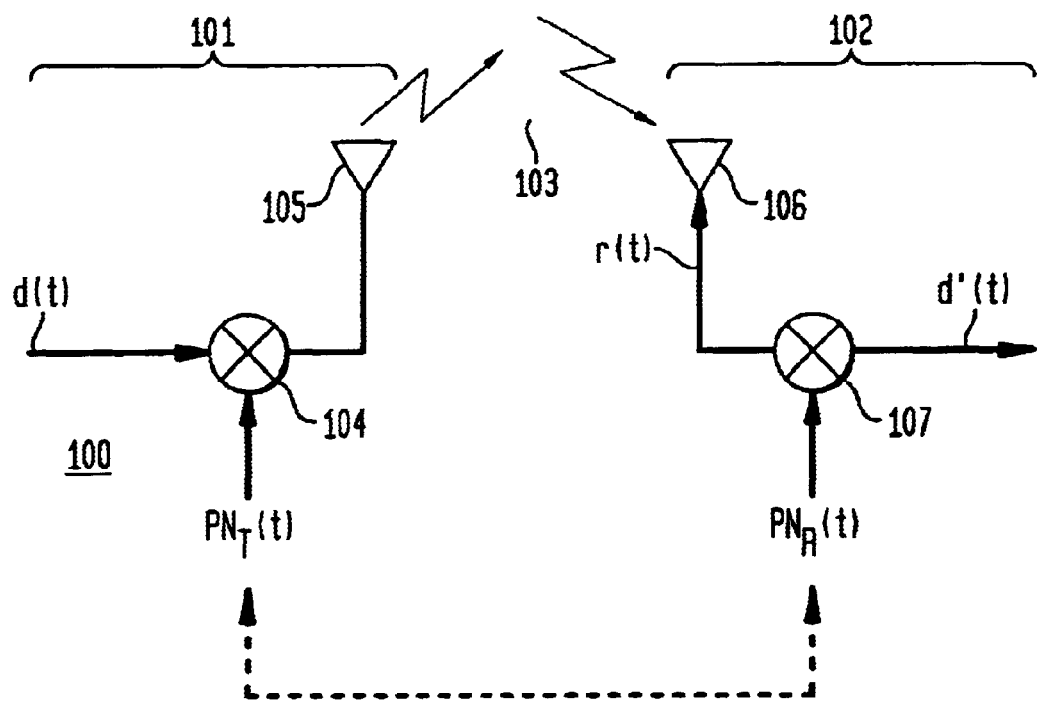
FIG. 1 shows a simplified diagram of a spread spectrum communication system of the prior art.
Figure 2:
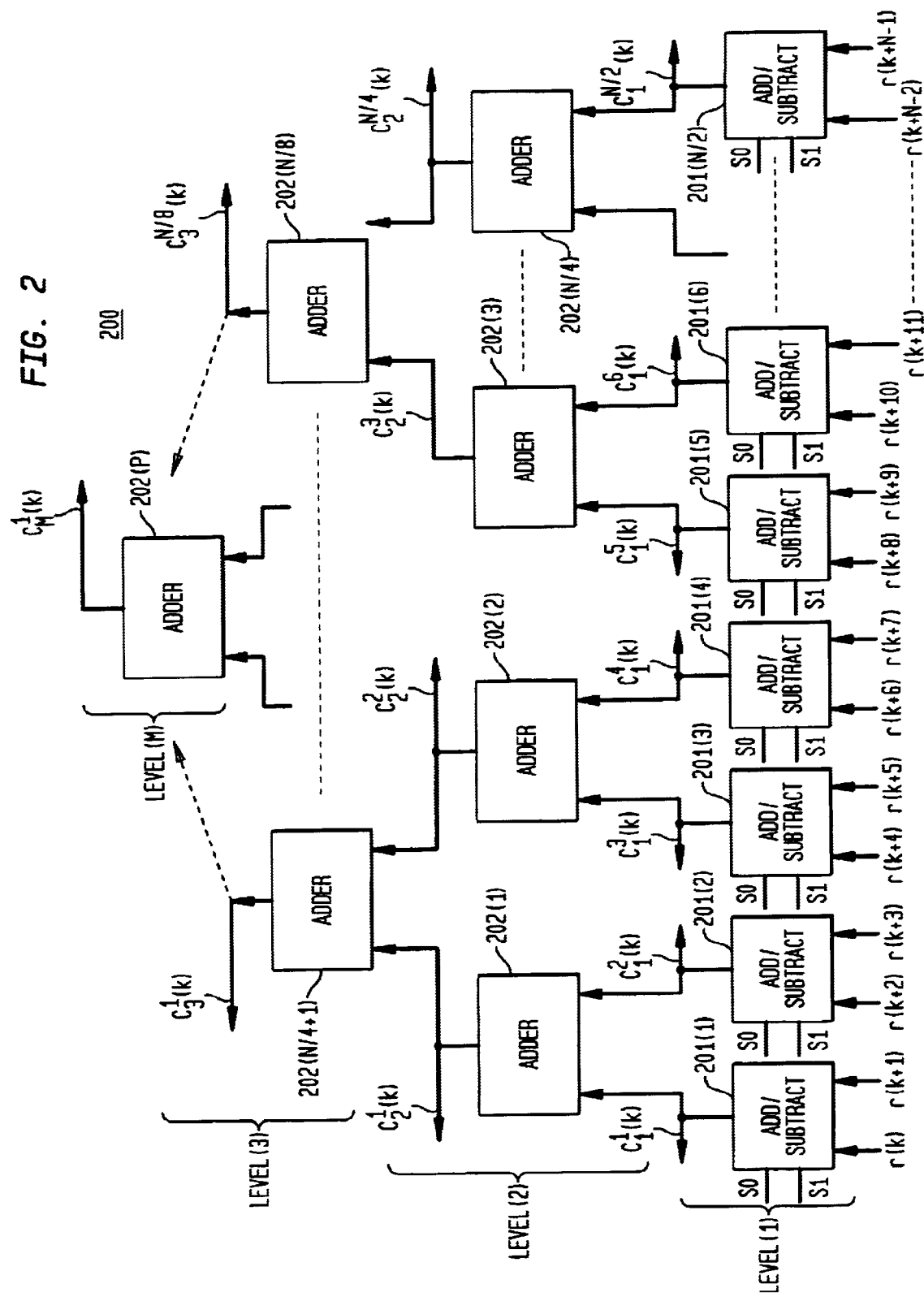
FIG. 2 shows a vector tree correlator in accordance with an exemplary embodiment of the present invention.

FIG. 2 shows a block diagram of vector tree correlator 200 in accordance with an exemplary embodiment of the present invention. Vector tree correlator 200 operates with an input sample sequence r={r(k), r(k+1), ..., r(k+N-1)} and a locally generated pseudo-random noise (PN) sequence with a maximum length of N, where N is equivalent to $2^M$. As defined herein, N and M are positive integers, and N is termed the maximum spreading rate. Vector tree correlator 200 comprises a first set of combiners shown as add/subtract logic units 201(1)–201(N/2), and a second set of combiners shown as adders 202(1)–202(P), where P is given as in equation (1)

$$P = \sum_{m=2}^{M} \frac{N}{2^m} \quad (1)$$

Vector tree correlator 200 is formed from M levels (indicated in FIG. 2 as Level (1) through Level (M)) configured as follows. Level (1) comprises add/subtract logic units 201(1)–201(N/2), where the number of add/subtract logic units is (N/2). Each of the add/subtract logic units 201(1)–201(N/2) receives a pair of received signal samples and combines the received signal samples based on a control signal input {S1, S0}. Level (2) through Level (M) each comprises a subset of adders 202(1)–202(P). The number of adders at Level (m), 1<m≦M, is (N/$2^m$). Each of the adders 202 in a given Level (m) receives as its input a pair of output accumulations from the previous Level (m-1). The output of adder 202(P) at the top of the tree is the result of the length N correlation.

The $i^{th}$ add/subtract logic unit 201(i) receives two received samples r(k+2(i-1)) and r(k+2(i-1)+1), 1≦i≦(N/2) from, for example, the A/D converter that generates the received sample sequence. The $i^{th}$ add/subtract logic unit 201(i) also receives the $i^{th}$ 2-bit control signal {S1, S0} that specifies the multiplication of two samples with two corresponding chips of the locally generated PN sequence prior to accumulation. The 2-bit control signal is provided from corresponding taps of the linear feedback shift register providing the locally generated PN sequence that is synchronized to the spreading sequence within the received sample sequence. The control signal {S1,S0}, for $i^{th}$ add/subtract logic unit 201(i) thus either 1) adds the input samples, 2) inverts one of the samples before adding, or 3) inverts both samples before adding. Thus, for example, a 2-bit control signal {S1,S0}={1,1} may add both the received samples as they are, a 2-bit input {S1,S0}={1,-1} or a 2-bit input {S1,S0}={-1,1} may invert one of the samples before adding it to the other sample, and a 2-bit input {S1,S0}={-1,-1} may invert both of the received samples before adding.

After the first level, Level (1), of add/subtract logic units 201(1)–201(N/2), each subsequent level, Level (2) through Level (M), comprises a subset of adders 202(1)–202(P) that combine corresponding pairs of output values from the next lower level. The outputs of the lower level may be paired sequentially from left to right to form (N/$2^m$) "groups" at Level (m) that may be traced downward through the tree to the corresponding received samples input to add/subtract logic units 201(1)–201(N/2).

For example, if the correlation by vector tree correlator 200 is over a length 64 spreading sequence, the maximum spreading rate N is 64 with M=6, yielding a tree having six levels. For this spreading rate of N=64, 32 add/subtract logic units are present at Level (1), 16 adders at Level (2), 8 on the next higher level and so on until at Level (6) a single, 2-input adder performs the last combination of the tree. The output of the adder at the top level of the tree provides the result of the maximum length 64 correlation.

In some systems, such as UMTS and third generation (3G) cellular systems, the spreading rate is not constant and varies with the raw data rate so as to keep the gross chip rate after spreading, the same. For these systems, however, the spreading rate may in addition to the maximum spreading rate be an integer power of two but less than the maximum spreading rate. In such systems, vector tree correlator 200 may be used to generate a correlation over a length of the spreading sequence that is less than the maximum spreading rate N. Thus, in accordance with the present invention, vector tree correlator 200 defines output tap points at different levels of the tree for different groups. Each tap point provides an accumulation corresponding to the correlation for one of the different spreading rates of length $2^m$ that is less than the maximum spreading rate N=$2^M$. These output tap points are denoted $C_m^b(k)$, where "m" denotes the level having the output tap and is a positive integer less than M, and "b" denotes the particular pair of outputs of a group combined from the previous level. The length of the accumulation present at the tap, corresponding to the accumulation for the desired spreading rate, is $2^m$.

Returning to FIG. 2, the tap $C_1^1(k)$ is the length $2^{(m=1)}(=2)$ correlation output from Level (1) corresponding to the accumulation (i.e., combination of values) of the first group, which for Level (1) corresponds to the first two received samples r(k) and r(k+1). Similarly, the tap $C_1^2(k)$ is the length $2^{(1)}$ (=2) correlation of the second group (the second two received samples r(k+2) and r(k+3)). The tap $C_2^1(k)$ is the length $2^{(m=2)}(=4)$ correlation output from Level (2) for the first group. At Level (2), the first group corresponds to the outputs of the first two adders 202(1) and 202(2), which, in turn, corresponds to the accumulation of the correlation of the first four received samples. Similarly, $C_2{}^2(k)$ is a length 4 correlation output of the second group of four samples.

In some applications, the data itself may be "repeated". For example, if the data bit has period T/2, a system may repeat the bit's value to generate a bit with period T before spreading. This padding of data bits is sometimes used to accommodate variable user data rates with a fixed spreading rate. In this case, vector tree correlator 200 may be employed to generate two or more correlation accumulation values with each accumulation value corresponding to one of the repeated data bits. For example, for the case of a repeated data bit, the output at tap points $C_{M-1}{}^1(k)$ and $C_{M-1}{}^2(k)$ each correspond to a different correlation of repeated user data bits, even though each is a partial correlation using half of the locally generated spreading sequence. Similarly, if instead of repeated data bits, two different data bits are spread with a PN sequence at half the maximum spreading rate, the output at tap points $C_{M-1}{}^1(k)$ and $C_{M-1}{}^2(k)$ each corresponds to correlations of the two different user data bits, respectively.

An implementation of vector tree correlator 200 may employ additional line drivers and/or tri-state buffers at each output tap point $C_m{}^b(k)$ to drive circuitry (not shown in FIG. 2) that receives results of the correlation process. In addition, a processor, not shown, may be employed to selectively activate or deactivate portions of the tree including tap points for specific types of correlation with spreading rates less than N. Such processor may be employed to control multiple and/or sequential correlation operations within the tree, as well as subsequent read and write operations to system buses. With such processor, correlations may be generated for sequences that are decomposed as now described.

While the exemplary embodiment is shown and described for spreading rates and PN sequences that are an integer power of two, the present invention is not so limited. One skilled in the art would realize that sequences may be decomposed into one part that is an integer power of two and another part comprising a divisor and/or remainder. Thus, a vector tree correlator as described herein may be adapted to other sequences by repeating operations of part or all of the tree based on the two parts of the decomposed sequence. For example, a length 40 sequence may be decomposed into 5 sequences of length $2^3=8$. The vector tree correlator may then be used for five separate correlation calculations with the output of each correlation added to an accumulator (either in an ongoing fashion to the topmost adder of the tree, or a separate accumulator external to the vector tree correlator). Alternatively, the length 40 sequence may be decomposed into a sequence of length $2^5=32$ and a sequence of length $2^3=8$. In this case, the vector tree architecture is used with M=5 levels to generate a correlation for the first 32 samples. Then the output of tap $C_1{}^3(k)$ is generated for the next 8 samples and added to the first accumulation. Thus, a trade-off between 1) added clock cycles or delay, and 2) added hardware complexity may exist for a given implementation.

While the exemplary embodiment is shown and described for even sequences of the form $2^m$, where m is a positive integer, one skilled in the art may readily extend the tree correlation structure to other, more general sequences of length $X^m$, where X a positive integer. For example, if a spreading sequence is correlated against a locally generated sequence both of which have length $3^m$, with maximum length $N=3^M$, then the tree structure would be modified as follows. The vector tree correlator would have M levels, with Level (1) comprising add/subtract logic units, and Level (2) through Level (M) comprising adders. Each add/subtract logic unit would be configured to receive i) three input samples and ii) a control signal $\{S0, S1, S2\}_i$, $1 \leq i \leq 3^{M-1}$ based on three chip values of the length $3^m$ sequence. The total number of add/subtract logic units would be $3^{M-1}$, each generating a correlation accumulation value for a group of three samples. Each adder would be configured to receive a group of three input correlation accumulation values from the level below to generate a single correlation accumulation value for the group.

A vector tree correlator architecture in accordance with the present invention may provide several advantages. First, the architecture is similar to that of a fixed length vector correlator, but allows generation of correlation values for multiple spreading rates, thus allowing for variable length correlation. Second, the architecture is relatively simple to implement in hardware such as an integrated circuit (IC). Third, if the sequences are decomposed, the vector tree architecture may be suited for circuits employing a given bus structure and a processor.

While the exemplary embodiments of the present invention have been described with respect to digital logic blocks, as would be apparent to one skilled in the art, various functions may be implemented in the digital domain as processing steps in a software program, in hardware by circuit elements, or in combination of both software and hardware. Such software may be employed in, for example, a digital signal processor, micro-controller or general-purpose computer. Such hardware and software may be embodied within circuits implemented in an integrated circuit.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for correlating a sequence of received samples with chip values of a locally generated sequence the apparatus comprising:

a first set of combiners configured as a first level of a tree structure to receive the sequence of received samples in groups, each combiner combining a group of at least two received samples based on corresponding chip values of the locally generated sequence to generate a correlation value for the group at the first level; and a second set of combiners configured as one or more additional levels of the tree structure, wherein, each combiner of the second set combines a group of at least two correlation values of an immediately preceding level of the tree structure to generate a correlation value for the group at a current level of the tree structure, and wherein each combiner of the first and second sets comprises an output tap that enables a generated correlation value to be read out of the tree structure corresponding to a one of a plurality of spreading rates of the locally generated sequence.

2. The invention as recited in claim 1, wherein each of the first set of combiners is an add/subtract logic unit.

3. The invention as recited in claim 2, wherein for each add/subtract logic unit the chip values dictate whether the corresponding received samples are inverted prior to combining.

4. The invention as recited in claim 1, wherein each of the second set of combiners is an adder.

5. The invention as recited in claim 1, wherein the plurality of spreading rates includes a maximum spreading rate N that is of length $X^M$, where X and M are positive integers, and each other of the plurality of spreading rates is less than the maximum spreading rate N and is of length $X^m$, $1 \leq m \leq M$.

6. The invention as recited in claim 5, wherein each of the first set of combiners is an add/subtract logic unit that combines X input samples based on X chip values of the locally generated sequence, and each of the second set of combiners is an adder, each adder receiving X correlation values from a previous level.

7. The invention as recited in claim 5, wherein X is 2.

8. The invention as recited in claim 1, wherein the apparatus is embodied in a circuit.

9. The invention as recited in claim 8, wherein the circuit is embodied in an integrated circuit.

10. The invention as recited in claim 8, wherein the circuit is included in a receiver of a code-division, multiple access communication system.

11. A method of correlating a sequence of received samples with chip values of a locally generated sequence, the method comprising the steps of:

a) combining, at a first level of a tree structure, groups of at least two received samples based on corresponding chip values of the locally generated sequence to generate a correlation value for each group at the first level; and b) combining, at one or more additional levels of the tree structure, a group of at least two correlation values of an immediately preceding level of the tree structure to generate a correlation value for the group at a current level of the tree structure, and c) providing a correlation value an output tap of any selected level of the tree structure corresponding to a one of a plurality of spreading rates of the locally generated sequence.

12. The invention as recited in claim 11, wherein the plurality of spreading rates includes a maximum spreading rate N that is of length $X^m$, where X and M are positive integers, and each other of the plurality of spreading rates is less than the maximum spreading rate N and is of length $X^m$, $1 \leq m < M$.

13. The invention as recited in claim 11, wherein the method is embodied in steps of a processor in an integrates circuit.

14. The invention as recited in claim 11, wherein the method is embodied in a processor of a receiver in a code-division, multiple access communication system.

15. A computer-readable medium having stored thereon a plurality of instructions, the plurality of instructions including instructions which, when executed by a processor, cause the processor to implement a method for correlating a sequence of received samples with chip values of a locally generated sequence, the method comprising the steps of:

a) combining, at a first level of a tree structure, groups of at least two received samples based on corresponding chip values of the locally generated sequence to generate a correlation value for each group at the first level; and b) combining, at one or more additional levels of the tree structure, a group of at least two correlation values of an immediately preceding level of the tree structure to generate a correlation value for the group at a current level of the tree structure, and c) providing a correlation value an output tap of any selected level of the tree structure corresponding to a one of a plurality of spreading rates of the locally generated sequence. generated sequence.

* * * * *

UNITED STATES PATENT AND TRADEMARK OFFICE
CERTIFICATE OF CORRECTION

PATENT NO.   : 6,928,105 B2
DATED        : August 9, 2005
INVENTOR(S)  : Sameer V. Ovalekar It is certified that error appears in the above-identified patent and that said Letters Patent is hereby corrected as shown below:

Column 8,
Line 21, replace "of a processor in an integrates" with -- of a processor in an integrated --.
Line 46, replace "generated sequence. generated sequence." with -- generated sequence. --.

Signed and Sealed this

Fourth Day of October, 2005

JON W. DUDAS
*Director of the United States Patent and Trademark Office*